United States Patent
Fritz-Langhals et al.

(10) Patent No.: US 10,351,676 B2
(45) Date of Patent: Jul. 16, 2019

(54) METHOD FOR PRODUCING ORGANOSILICON COMPOUNDS HAVING AMINO ACID GROUPS

(71) Applicant: Wacker Chemie AG, Munich (DE)

(72) Inventors: Elke Fritz-Langhals, Ottobrunn (DE); Richard Weidner, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 15/571,912

(22) PCT Filed: May 30, 2016

(86) PCT No.: PCT/EP2016/062102
§ 371 (c)(1),
(2) Date: Nov. 6, 2017

(87) PCT Pub. No.: WO2016/193188
PCT Pub. Date: Dec. 8, 2016

(65) Prior Publication Data
US 2018/0118889 A1 May 3, 2018

(30) Foreign Application Priority Data

Jun. 2, 2015 (DE) ........................ 10 2015 210 173

(51) Int. Cl.
| | |
|---|---|
| *C08G 77/388* | (2006.01) |
| *C08K 5/05* | (2006.01) |
| *C08K 5/17* | (2006.01) |
| *C08L 83/06* | (2006.01) |
| *C08G 77/14* | (2006.01) |

(52) U.S. Cl.
CPC .............. *C08G 77/388* (2013.01); *C08K 5/05* (2013.01); *C08K 5/175* (2013.01); *C08L 83/06* (2013.01); *C08G 77/14* (2013.01)

(58) Field of Classification Search
None
See application file for complete search history.

(56) References Cited

U.S. PATENT DOCUMENTS 9,481,695 B2    11/2016   Knott et al.
2015/0023900 A1*  1/2015   Knott .................... C07F 9/5407
                                                      424/70.1

FOREIGN PATENT DOCUMENTS

| DE | 10036532 A1 | 2/2002 |
|---|---|---|
| EP | 2231753 B1 | 8/2012 |
| EP | 2826806 A1 | 1/2015 |
| EP | 2231752 B1 | 4/2015 |
| JP | 52114699 A | 9/1977 |
| JP | 03223207 A | 10/1991 |

OTHER PUBLICATIONS

English language abstract for DE 10036532 A1 (2002).
English language abstract for JP 52114699 A (1977).
International Search Report from corresponding PCT/EP2016/062102 dated Jul. 22, 2016.
Machine Translation of JP 03223207 (1991).

* cited by examiner

Primary Examiner — Clinton A Brooks
Assistant Examiner — Kofi Adzamli
(74) Attorney, Agent, or Firm — Caesar Rivise, PC

(57) ABSTRACT

The present invention relates to a method for producing amino acid group-containing organosilicon compounds (O), wherein the epoxy group-bearing organosilicon compounds are reacted with a stoichiometric excess of amino acids or the salts thereof in the presence of an alcohol.

12 Claims, No Drawings

METHOD FOR PRODUCING ORGANOSILICON COMPOUNDS HAVING AMINO ACID GROUPS

CROSS-REFERENCE TO RELATED APPLICATIONS

This application is a U.S. National Phase Application of PCT/EP2016/062102, filed May 30, 2016, which claims priority from DE 10 2015 210 173.8, filed Jun. 2, 2015, the contents of which applications are incorporated herein by reference in their entireties for all purposes.

BACKGROUND OF THE INVENTION

The invention relates to a simple process for producing amino acid moiety-containing organosilicon compounds.

Amino group-containing organosilicon compounds play an important role in industry. The presence of the polar amino group in a polysiloxane significantly increases the interaction with polar surfaces and thus the adhesiveness of the polysiloxane for example. This gives rise to a multitude of possible industrial applications, for example in the field of textiles finishing or in cosmetics. In this connection amino acid-functionalized organosilicon compounds are very interesting because the additional presence of the carboxylic acid moiety can achieve a much higher still polarity. A further positive aspect is that the production thereof can utilize the broad and also cost-effective feedstock base of the industrially available amino acids. The very predominant portion of the amino acids is generated from renewable feedstocks and the product class of organosilicon compounds containing an amino acid moiety therefore also offers advantages from the aspect of sustainability.

Various processes for preparing amino acid-functionalized polysiloxanes are already known. It is amino acid-functional organosilicon compounds where the basic character of the amino moiety is retained even after linking with the polysiloxane that are primarily of interest. This is the case particularly for the linking of the amino acid with the polysiloxane by addition onto a reactive epoxide moiety on the polysiloxane.

According to this principle EP 2826806, EP 2231752, DE 10036532 and JP 52-114699 describe various production variants for amino acid-functional polysiloxanes.

In the prior art the reactions are always performed with 1 mol of amino acid per mole of epoxide moiety. Following this technical teaching however affords products which have poor solubility or have insoluble constituents.

However, for industrial applicability of amino acid-functional siloxanes in various fields of application solubility plays an important role. Poorly soluble or even insoluble products cannot be applied uniformly or in a desired low concentration for example. This often results in increased consumption and is therefore uneconomic. In addition, purification of the products is impeded enormously. Inhomogeneities can result in attenuation or loss of the industrially required properties or else can have undesired side effects.

Insufficient solubility is a problem for the industrially interesting higher molecular weight systems in particular, since solubility generally decreases with increasing molecular weight.

The solubility problem mentioned is circumvented in EP 2826806 when the amino acid moiety is introduced as a salt of an organic cation, for example a quaternary ammonium or phosphonium cation having a long-chain alkyl radical, which increases the solubility of the system. A great disadvantage here is that in the process the amino acids must initially be converted in a two-stage process into the quaternary ammonium salts or the phosphonium salts before the actual reaction with the polysiloxane is effected. In addition, the quaternary ammonium/phosphonium compounds are extremely costly components. The biocidal activity and poor biodegradability of the quaternary ammonium salts also makes the use of this compound class controversial.

In the process described in EP 2231753 the solubility problem is circumvented by performing the reaction a priori in heterogeneous phase in aqueous emulsion in the presence of an emulsifier. This process preferably employs polyether moiety-containing polysiloxanes which greatly increase the propensity for formation of stable emulsions.

A disadvantage of this process is that the formed amino acid group-bearing siloxane is always generated in admixture with an emulsifier which cannot be removed from the product. The obtained products cannot be isolated in pure form according to this teaching. This restricts the field of application.

DESCRIPTION OF THE INVENTION

The present invention provides a process for producing amino acid moiety-containing organosilicon compounds (O), wherein epoxide unit-bearing organosilicon compounds are reacted with a stoichiometric excess of amino acids or salts thereof in the presence of an alcohol.

It has now been found that, surprisingly, reaction of epoxide moiety-bearing organosilicon compounds with a stoichiometric excess of amino acid in the presence of alcohols results in amino acid-functional organosilicon compounds having an improved solubility. The workup of the product solutions and the application of the compounds are thus simplified significantly.

In the process it is preferable when epoxy-functional organosilicon compounds composed of at least one unit of general formula I and no unit or at least one unit of general formula II

where Z represents

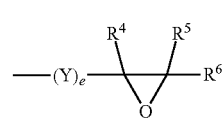

are employed, wherein $R^1$ and $R^2$ independently of one another represent hydrogen or an unbranched, branched or cyclic saturated or unsaturated alkyl group or alkoxy group having 1 to 20 carbon atoms or aryl group or aralkyl group, wherein individual nonadjacent methylene units may be replaced by —O—, —CO—, —COO—, —OCO— or —OCOO—, —S— or $NR^x$ groups or by an oxyalkylene group of general formula (—O—$CH_2$—$CHR^3$—)$_d$ where d is from 1 to 100, wherein the radicals $R^3$ represent hydrogen or alkyl, $R^x$ represents hydrogen or a $C_1$-$C_{10}$ hydrocarbon radical which is unsubstituted or substituted with substituents selected from —CN and halogen, Y represents a linear, branched, cyclic, saturated or mono- or polyunsaturated $C_1$ to $C_{100}$ alkylene radical bonded to the organosilicon compound via a carbon atom, wherein individual carbon atoms may be replaced by oxygen, nitrogen or sulfur atoms, $R^4$, $R^5$ and $R^6$ independently of one another represent hydrogen or a linear, branched or cyclic saturated or unsaturated $C_1$ to $C_{20}$ alkyl group, wherein individual nonadjacent methylene units may be replaced by —O—, —CO—, —COO—, —OCO— or —OCOO—, —S— or $NR^x$ groups, a takes values of 0, 1, 2 or 3,
b takes values of 0, 1, or 2,
c takes values of 1, 2, or 3,
b+c takes values of 1, 2, 3 or 4, and
e takes values of 0 or 1.

It is preferable when $R^1$ and $R^2$ represent hydrogen or an unbranched, branched or cyclic saturated or unsaturated alkyl group having 1 to 6 carbon atoms or a benzyl or phenyl group, wherein nonadjacent methylene units may be replaced by nitrogen atoms or oxygen atoms or may be replaced by an oxyalkylene group of general formula (—O—CH$_2$—CHR$^3$—)$_d$ where d is from 1 to 100, in particular 1 to 50, wherein the radicals $R^3$ represent hydrogen or methyl. Particularly preferred radicals $R^1$ and $R^2$ are the radicals methyl, ethyl, vinyl.

It is preferable when $R^x$ represents hydrogen or an unbranched, branched or cyclic saturated alkyl group having 1 to 6 carbon atoms or a benzyl or phenyl group. Particularly preferred radicals $R^x$ are hydrogen and the radicals methyl, ethyl, propyl, butyl.

It is preferable when Y is a linear or branched saturated $C_3$ to $C_{20}$ alkylene radical, wherein individual carbon atoms may be replaced by oxygen, nitrogen or sulfur atoms. In a further particularly preferred embodiment Y is an oxyalkylene radical of general formula —CH$_2$—CH$_2$—CH$_2$—O—(CH$_2$—CHR$^3$—O)$_g$—CH$_2$, wherein the radicals $R^3$ independently of one another represent hydrogen or alkyl, in particular methyl, and g takes a value of 0 to 100, preferably 0 to 50 and particularly preferably 0.

It is preferable when the radicals $R^4$, $R^5$ and $R^6$ independently of one another represent hydrogen or a linear $C_1$ to $C_6$ alkyl group, particularly preferably hydrogen or linear $C_1$ to $C_3$ alkyl group, in particular the radicals methyl, ethyl, propyl. The radicals $R^5$ and $R^6$ may also be bonded to one another and to the moiety Y via alkylene radicals, in particular $C_1$ to $C_6$ alkylene radicals or oxygen.

Examples of epoxide unit-bearing Si-bonded moieties Z are:

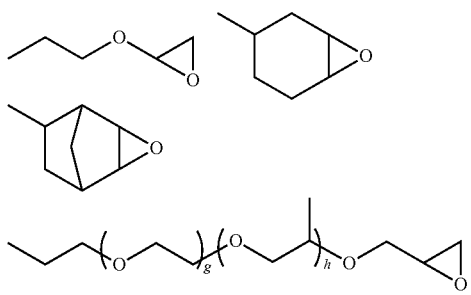

g + h = 1-100

The epoxy group-bearing organosilicon compounds—as is known to those skilled in the art—may be produced for example by addition of Si—H moieties onto olefinic group-bearing epoxides, for example allyl glycidyl ethers or cyclo- hexadiene monoepoxide or by epoxidation of olefinic moiety-bearing organosilicon compounds or by dehydrohalogenation of chlorohydrins.

The employed amino acids preferably have general formula III

wherein $R^7$ represents hydrogen or a linear, branched or cyclic saturated or unsaturated alkyl group having 1 to 20 carbon atoms or aryl group or aralkyl group, wherein individual nonadjacent methylene units may be replaced by —O—, —CO—, —COO—, —OCO— or —OCOO—, —S— or $NR^x$ groups or by an oxyalkylene group of general formula (—O—CH$_2$—CHR$^3$—)$_d$ where d is from 1 to 100, wherein the radicals $R^3$ independently of one another represent hydrogen or alkyl, $R^8$ and $R^9$ independently of one another represent hydrogen or linear, branched or cyclic saturated or unsaturated alkyl groups having 1 to 20 carbon atoms or aryl groups or aralkyl groups, wherein individual nonadjacent methylene units may be replaced by —O—, —CO—, —COO—, —OCO— or —OCOO—, —S— or $NR^x$ groups, wherein $R^7$ may be bonded to $R^8$ or to $R^9$, $R^{10}$ is selected from hydrogen, metal and $N(R^{11})_4$, $R^{11}$ represents hydrogen, $C_1$ to $C_{20}$ alkyl, aryl or aralkyl and f takes integer values from 0 to 50.

$R^7$ preferably represents hydrogen or a linear, branched or cyclic saturated or unsaturated alkyl group having 1 to 10 carbon atoms or a benzyl or phenyl group, wherein nonadjacent methylene units may be replaced by nitrogen atoms or oxygen atoms or may be replaced by an oxyalkylene group of general formula (—O—CH$_2$—CHR$^3$—)$_d$ where d is from 1 to 100, wherein the radicals $R^3$ independently of one another represent hydrogen or methyl. $R^7$ particularly preferably represents a $C_1$-$C_6$ alkyl group, wherein methylene units may be replaced by oxyalkylene groups of general formula —O—(CH$_2$—CHR$^3$—)$_d$ where d is from 1 to 50, wherein the radicals $R^3$ independently of one another represent hydrogen or methyl. Particularly preferred radicals $R^7$ are the radicals methyl, ethyl, propyl, butyl.

It is preferable when $R^8$ represents hydrogen and $R^9$ represents hydrogen or a linear, branched or cyclic saturated or unsaturated alkyl group having 1 to 10 carbon atoms or aryl group or aralkyl group, wherein individual nonadjacent methylene units may be replaced by —O—, —CO—, —COO—, —OCO— or —OCOO—, —S— or $NR^x$ groups, in particular —CH$_3$, —CH(CH$_3$)$_2$, —CH$_2$—CH(CH$_3$)$_2$, —CH(CH$_3$)—CH$_2$—CH$_3$, —CH$_2$—OH, —CH$_2$—CH$_2$—OH, —CHOH—CH$_3$, —CH$_2$—SH, —CH$_2$—S—S—CH$_2$—CH(NH$_2$)COOH, —CH$_2$—CH$_2$—S—CH$_3$, —CH$_2$—CH$_2$—CONH$_2$, —CH$_2$—CONH$_2$, CH$_2$—CH$_2$—COOH, CH$_2$—COOH, —CH$_2$—CH$_2$—CH$_2$—NH—CO—NH$_2$, —CH$_2$-phenyl, —CH$_2$-(4-hydroxyphenyl), —CH$_2$—CH$_2$—CH$_2$—CH$_2$—NH$_2$, —CH$_2$—CH$_2$—CH$_2$—NH$_2$, —CH$_2$—CH$_2$—CH$_2$—NH—C(=NH)—NH$_2$, and —CH$_2$-(4-imidazolyl), —CH$_2$-(3-indolyl).

$R^{10}$ preferably represents hydrogen, alkali metal or alkaline earth metal or $N(R^{11})_4$, wherein $R^{11}$ preferably represents hydrogen or $C_1$ to $C_{12}$ alkyl, in particular $C_1$ to $C_6$ alkyl or phenyl; it is very particularly preferable when $R^{10}$ represents hydrogen or alkali metal, in particular sodium or potassium.

f preferably has integer values of 0 to 10, particularly preferably 0 to 5 and very particularly preferably values of 0, 1, 2 or 3.

For the amino acids $R^7$ may also be bonded to $R^8$ or to $R^9$; it is preferable when the radicals are bonded via an alkylene radical, an example thereof is the amino acid proline.

Preferred examples of amino acids are glycine, sarcosine, alanine, ß-alanine, valine, leucine, isoleucine, γ-aminobutyric acid, serine, homoserine, threonine, cysteine, cystine, methionine, glutamine, asparagine, proline phenylalanine, tyrosine, glutamic acid, aspartic acid, citrulline, lysine, ornithine, arginine, histidine and tryptophan or salts thereof.

For amino acids having more than one carboxyl group the further carboxyl groups may independently of one another be present as free carboxyl groups or as salts, preferably metal or ammonium salts, particularly preferably as alkali metal salts, alkaline earth metal salts and tertiary amines, very particularly preferably as sodium or potassium salts, or in the form of their esters, preferably alkyl esters, particularly preferably as methyl esters or ethyl esters.

The bonding of the amino acid onto the epoxy moiety-containing organosilicon compound is effected by the epoxide ring-opening addition of the moiety $NHR^7$ of the amino acid of general formula III. When $R^7$ represents hydrogen the thus formed product may react with a further epoxide moiety in the same way. Accordingly, products having one siloxane radical and products having two siloxane radicals per amino acid may be formed. Amino acids having further basic nitrogen-containing moieties, for example lysine, ornithine, arginine, histidine and tryptophan may via these moieties also react once or twice with the epoxide radical of the organosilicon compound. Not more than one organosilicon radical per hydrogen atom may be bonded to a basic nitrogen moiety of the amino acid of general formula III.

It is preferable when in the process per mole of epoxide units present not less than 1.2 mol and not more than 100 mol of the amino acid, preferably not less than 2 mol and not more than 50 mol, particularly preferably not less than 3 mol and not more than 10 mol, in particular of general formula III are employed.

The process according to the invention may employ any desired optical isomers of the amino acids. It is likewise possible to employ mixtures of amino acids.

The reaction is performed in the presence of one or more alcohols, preferably of general formula $R^{12}$—OH.

It is preferable when $R^{12}$ is a linear or branched alkyl group having 1 to 20 carbon atoms, wherein nonadjacent carbon atoms may be replaced by oxygens. It is particularly preferable when $R^{12}$ is a linear or branched alkyl group having 1 to 5 carbon atoms, wherein preferably 1 to 2 carbon atoms may be replaced by oxygens. Particular preference is given to alkyl groups having 1 to 5 carbon atoms, wherein particularly preferably 1 carbon atom is replaced by oxygen. Examples of alcohols are methanol, ethanol, n-propanol, iso-propanol, n-butanol, iso-butanol, tert-butanol, tert-amyl alcohol, benzyl alcohol, ethylene glycol, propylene glycol, 2-methoxyethanol, 2-methoxypropanol, 2-ethoxyethanol and glycerol, polyethylene glycol or polypropylene glycol or cocondensates of polyethylene glycol and polypropylene glycol.

Alcohol is preferably employed in proportions of not less than 1 wt % and not more than 10 000 wt %, particularly preferably in proportions of not less than 10 wt % and not more than 5000 wt % and very particularly preferably in proportions of not less than 50 wt % and not more than 1000 wt % based on the mass of the employed epoxide-functionalized organosilicon compound. The reaction mixture may moreover contain water, preferably not less than 0.1 wt % and not more than 1000 wt %, particularly preferably in proportions of not less than 1 wt % and not more than 500 wt % and very particularly preferably in proportions of not less than 5 wt % and not more than 1000 wt % based on the mass of the employed epoxide-functionalized organosilicon compound.

The reaction may be performed in batch mode or in semi-batch mode or in continuous fashion.

It is preferable when one of the two reaction partners, preferably the amino acid, is initially charged in alcohol and subsequently the epoxide-functional organosilicon compound is added.

The reaction times are preferably not less than 1 min to not more than 100 hours, particularly preferably not less than 30 min to not more than 20 hours and very particularly preferably not less than 1 hour to not more than 10 hours.

The reaction is preferably performed at temperatures of not less than 0° C. and not more than 200° C., preferably not less than 20° C. and not more than 140° C. and particularly preferably not less than 40° C. and not more than 100° C.

The reaction is performed at a pressure between not less than 0.1 mbar to not more than 50 bar, preferably not less than 100 mbar to not more than 20 bar, particularly preferably at not less than 0.9 bar to 10 bar.

The reaction may employ further components, for example solvents, in amounts of not less than 1% and not more than 500%, preferably not less than 10% and not more than 200%, based on the overall reaction mass. Examples of solvents are linear or cyclic, saturated or unsaturated hydrocarbons, for example pentane, cyclohexane, toluene, ethers such as methyl-tert-butylether, tetrahydrofuran or dioxane, halohydrocarbons, such as dichloromethane, 1,2-dichloroethane or chlorobenzene, or so-called dipolar aprotic solvents such as acetonitrile, dimethyl sulfoxide or dimethylformamide.

Organosilicon compounds (O) obtained by the reaction may be isolated by removal of the alcohol and of any solvent. The removal is preferably effected by distillation. Further purification steps may follow if required. For example, unreacted amino acid may be removed by washing of the product with water or by liquid-liquid extraction. It is for example also possible to remove the unconverted amino acid from the product as a solid by addition of a solvent in which the amino acid is poorly soluble, for example methyl-tert-butyl ether or alcohol or mixtures thereof.

All abovementioned symbols of the abovementioned formulae are each defined independently of one another. The silicon atom is tetravalent in all formulae.

In the examples which follow, unless otherwise stated in each case, all amounts and percentages reported are based on weight and all temperatures are 20° C.

EXAMPLE 1 (α,ω, N=54)

16.6 g (113 mmol) of lysine are dissolved in 800 ml of ethanol and the mixture is heated to 78° C. At this temperature 41.0 g of α,ω-glycidoxypropyl-functionalized polysiloxane (MW~4300, about 9.45 mmol of epoxide groups) are added over 4 hours and the reaction temperature is held at 78° C. for a further 4 hours. NMR analysis determines complete conversion of all epoxide groups present. Ethanol is distilled off under vacuum and the residue is washed with water to remove lysine. After drying 44 g of amino acid-functional polysiloxane having a honey-like consistency are obtained. NMR spectroscopic analysis indicates quantitative conversion of the epoxide groups and covalent bonding of lysene.

EXAMPLE 2 ($\alpha,\omega$, N=54)

105 g (718 mmol) of lysine together with 45.8 g (694 mmol) of 85 percent potassium hydroxide are dissolved in 1100 mL of isopropanol at room temperature. The mixture is heated to reflux temperature, 250 g of $\alpha,\omega$-glycidoxypropyl-functionalized polysiloxane (MW~4180, about 120 mmol of epoxide groups) are added over 5 hours and after completion of addition the mixture is boiled for a further 2 hours. NMR analysis indicates complete conversion of all epoxide groups present. After cooling, a mixture of 77.5 g of 32% HCl (about 680 mmol) and 86 g of water is added. Isopropanol is distilled off under vacuum and the residue (368 g) is washed several times with water to remove lysine. After drying under vacuum 302 g of amino acid-functional polysiloxane are obtained. Solubility in ethanol at room temperature: 7.2 wt %.

EXAMPLE 3 (NA SALT, $\alpha,\omega$, N=54)

24.0 g (164 mmol) of lysine are dissolved at 78° C. in 1600 ml of ethanol with addition of 8.69 g (161 mmol) of sodium methoxide. At this temperature 59.2 g of $\alpha,\omega$-glycidoxypropyl-functionalized polysiloxane (MW~4300, about 27.5 mmol of epoxide groups) in 40 g of ethanol are added over 5 hours and the reaction temperature is held at 78° C. for a further 1.5 hours. NMR analysis indicates complete conversion of all epoxide groups present. Ethanol is distilled off under vacuum and the residue is washed with water to remove lysine. After drying 69 g of amino acid-functional polysiloxane are obtained. NMR spectroscopic analysis indicates quantitative conversion of the epoxide groups and covalent bonding of lysene.

EXAMPLE 4 (LATERAL, K SALT IN ISOPROPANOL)

44.6 g (305 mmol) of lysine are dissolved at room temperature in 800 ml of isopropanol with addition of 19.5 g (295 mmol) of 85 percent KOH. The mixture is heated to reflux temperature and 200 g of Sipell RE 63 F, a laterally glycidoxypropyl group-functionalized polysiloxane (MW~11 800, function density 0.250 mmol/g; 50.0 mmol of epoxide groups), are added over 6 hours and the reaction temperature is held at 78° C. for a further hour. NMR analysis indicates complete conversion of all epoxide groups present. After cooling the reaction solution is admixed with a mixture of 24.3 g of 32% HCl and 35 g of water and is concentrated by evaporation on a rotary evaporator. The residue is continuously extracted with 1200 ml of methyl-tert-butyl ether at reflux; methyl-tert-butyl ether is then distilled off under vacuum. The residue consists of 187 g of product.

Solubility in ethanol at room temperature: 31 wt %.

EXAMPLE 5 (MACROMER, n=17)

32.0 g (219 mmol) of lysine are dissolved in 314 g of methanol at 65° C. and then admixed with 50.0 g (36.5 mmol) of $\alpha$-glycidoxypropyl-$\omega$-n-butyl-functionalized linear polydimethylsiloxane (chain length about 17 Si—O units, MG~1370). The mixture is allowed to boil under reflux for 20 hours and then cooled to room temperature. Methanol is removed under vacuum on a rotary evaporator. The residue is washed with water and dried. The product is obtained as a viscous oil. NMR spectroscopic analysis indicates quantitative conversion of the epoxide groups and covalent bonding of lysene.

EXAMPLE 6 (MACROMER, N=17, NA SALT)

12.8 g (87.5 mmol) of lysine are dissolved at 65° C. in 255 ml of methanol with addition of 4.5 g (83 mmol) of sodium methoxide. At this temperature 20.0 g (14.6 mmol) of $\alpha$-glycidoxypropyl-$\omega$-n-butyl-functionalized linear polydimethylsiloxane (chain length about 17 Si—O units, MW~1370) are added over 2.5 hours and the mixture is heated under reflux for a further 2 hours. NMR analysis indicates complete conversion of all epoxide groups present. 7 g of an oily bottom phase are removed (consists of impurities present in the starting material) and the top phase is concentrated by evaporation on a rotary evaporator. 21.5 g of crude product are obtained. To remove excess lysine the crude product is dissolved in methyl-tert-butyl ether and shaken with about 20 percent aqueous sodium chloride solution. The organic phase is removed and concentrated by evaporation. 18 g of product are obtained.

EXAMPLE 7 (MACROMER N=100)

5.85 g (40.0 mmol) of lysine are dissolved in 325 g of ethanol at reflux temperature and then admixed with 50.0 g (6.66 mmol) of $\alpha$-glycidoxypropyl-$\omega$-n-butyl-functionalized linear polydimethylsiloxane (chain length about 100 Si—O units). The mixture is allowed to boil under reflux for 20 hours and then cooled to room temperature. Two liquid phases are formed. The top phase is removed, the bottom phase is concentrated by evaporation on a rotary evaporator and dispersed in methyl-tert-butyl ether. The insoluble constituents (unconverted lysine) are decanted off and the MTBE phase is concentrated by evaporation. The product is obtained as a viscous oil. NMR spectroscopic analysis indicates quantitative conversion of the epoxide groups and covalent bonding of lysene.

EXAMPLE 8 (MACROMER, N=100, NA SALT)

4.67 g (32 mmol) of lysine are dissolved at 78° C. in 330 ml of ethanol with addition of 1.69 g (31.3 mmol) of sodium methoxide. At this temperature 40.0 g (5.33 mmol) of $\alpha$-glycidoxypropyl-$\omega$-n-butyl-functionalized linear polydimethylsiloxane (chain length about 100 Si—O units, MW~7500) are added over 3.5 hours and the mixture is heated under reflux for a further 2 hours. NMR analysis indicates complete conversion of all epoxide groups present. Cooling results in separation of an oily product phase. Said phase is removed and devolatilized on a rotary evaporator. 32 g of product are obtained.

COMPARATIVE EXAMPLE (NONINVENTIVE)

Example 2 is repeated with 17.5 g (120 mmol) of lysine, corresponding to 1.0 equivalent of lysine per epoxide moiety, and 7.63 g (116 mmol) of 85 percent KOH. Solubility of the obtained product in ethanol at room temperature: 3.4 wt %.

COMPARATIVE EXAMPLE (NONINVENTIVE)

Example 4 is repeated with 7.31 g (50.0 mmol) of lysine, corresponding to 1.0 equivalent of lysine per epoxide moiety, and 3.19 g (48.3 mmol) of 85 percent KOH. Solubility of the obtained product in ethanol at room temperature: 6.9 wt %.

The invention claimed is:

1. A process for producing amino acid moiety-containing organosilicon compounds, wherein:
   (a) epoxide unit-bearing organosilicon compounds are reacted with a stoichiometric excess of amino acids or salts thereof in a presence of an alcohol, wherein per mole of epoxide units present not less than 1.2 moles of the amino acids are employed
   (b) the epoxide unit-bearing organosilicon compounds comprise at least one unit of general formula I and no unit or at least one unit of general formula II $$R^1{}_b(Z)_c SiO_{[4-(b+c)]/2} \qquad (I),$$

$$R^2{}_a SiO_{(4-a)/2} \qquad (II),$$

wherein Z represents

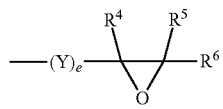

$R^1$ and $R^2$ independently of one another represent hydrogen or an unbranched, branched or cyclic saturated or unsaturated alkyl group or alkoxy group having 1 to 20 carbon atoms or aryl group or aralkyl group, wherein individual nonadjacent methylene units are optionally replaced by —O—, —CO—, —COO—, —OCO— or —OCOO—, —S— or $NR^x$ groups or by an oxyalkylene group of general formula $(-O-CH_2-CHR^3-)_d$ where d is from 1 to 100, wherein the radicals $R^3$ represent hydrogen or alkyl, $R^x$ represents hydrogen or a $C_1$-$C_{10}$ hydrocarbon radical which is unsubstituted or substituted with substituents selected from the group consisting of —CN and halogen, Y represents a linear, branched, cyclic, saturated or mono- or polyunsaturated $C_1$ to $C_{100}$ alkylene radical bonded to the organosilicon compounds via a carbon atom, wherein individual carbon atoms are optionally replaced by oxygen, nitrogen or sulfur atoms, $R^4$, $R^5$ and $R^6$ independently of one another represent hydrogen or a linear, branched or cyclic saturated or unsaturated $C_1$ to $C_{20}$ alkyl group, wherein individual nonadjacent methylene units are optionally replaced by —O—, —CO—, —COO—, —OCO— or —OCOO—, —S— or $NR^x$ groups, a takes values of 0, 1, 2 or 3,
   b takes values of 0, 1, or 2,
   c takes values of 1, 2, or 3,
   b+c takes values of 1, 2, 3 or 4, and
   e takes values of 0 or 1; and
   (c) the amino acids have general formula III $$H-NR^7-(CH_2)_f-CR^8R^9-(COO)^-(R^{10})^+ \qquad (III),$$

wherein
   $R^7$ represents hydrogen or a linear, branched or cyclic saturated or unsaturated alkyl group having 1 to 20 carbon atoms or aryl group or aralkyl group, wherein individual nonadjacent methylene units are optionally replaced by —O—, —CO—, —COO—, —OCO— or —OCOO—, —S— or $NR^x$ groups or by an oxyalkylene group of general formula $(-O-CH_2-CHR^3-)_d$ where d is from 1 to 100, wherein the radicals $R^3$ independently of one another represent hydrogen or alkyl, $R^8$ and $R^9$ independently of one another represent hydrogen or linear, branched or cyclic saturated or unsaturated alkyl groups having 1 to 20 carbon atoms or aryl groups or aralkyl groups, wherein individual nonadjacent methylene units are optionally replaced by —O—, —CO—, —COO—, —OCO— or —OCOO—, —S— or $NR^x$ groups, wherein $R^7$ is optionally bonded to $R^8$ or to $R^9$, $R^{10}$ is a member selected from the group consisting of hydrogen, metal and $N(R^{11})_3$, $R^{11}$ represents hydrogen, $C_1$ to $C_{20}$ alkyl, aryl or aralkyl and f takes integer values from 0 to 50.

2. The process as claimed in claim 1, wherein aliphatic alcohols of general formula $R^{10}$—OH are employed, wherein $R^{10}$ represents a linear or branched alkyl group having 1 to 20 carbon atoms, wherein nonadjacent carbon atoms are optionally replaced by oxygens.

3. The process as claimed in claim 1, wherein Z is selected from the formulae

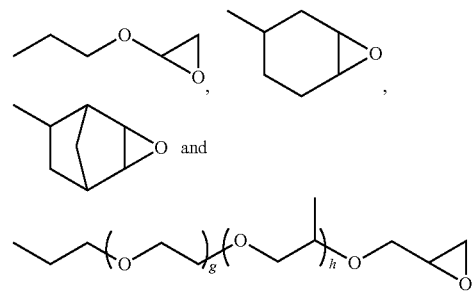

where g+h=1-100.

4. The process as claimed in claim 1, wherein $R^7$ represents hydrogen or a linear, branched or cyclic saturated or unsaturated alkyl group having 1 to 10 carbon atoms or a benzyl or phenyl group.

5. The process as claimed in claim 1, wherein $R^8$ and $R^9$ are each independently selected from the group consisting of —CH$_3$, —CH(CH$_3$)$_2$, —CH$_2$—CH(CH$_3$)$_2$, —CH(CH$_3$)—CH$_2$—CH$_3$, —CH$_2$—OH, —CH$_2$—CH$_2$—OH, —CHOH—CH$_3$, —CH$_2$—SH, —CH$_2$—S—S—CH$_2$—CH(NH$_2$)COOH, —CH$_2$—CH$_2$—S—CH$_3$, —CH$_2$—CH$_2$—CONH$_2$, —CH$_2$—CONH$_2$, CH$_2$—CH$_2$—COOH, CH$_2$—COOH, —CH$_2$—CH$_2$—CH$_2$—NH—CO—NH$_2$, —CH$_2$-phenyl, —CH$_2$-(4-hydroxyphenyl), —CH$_2$—CH$_2$—CH$_2$—CH$_2$—NH$_2$, —CH$_2$—CH$_2$—CH$_2$—NH$_2$, —CH$_2$—CH$_2$—CH$_2$—NH—C(=NH)—NH$_2$, —CH$_2$—(4-imidazolyl) and —CH$_2$-(3-indolyl).

6. The process as claimed in claim 1, wherein $R^1$ and $R^2$ are selected from the group consisting of hydrogen, methyl, ethyl and vinyl.

7. The process as claimed in claim 1, wherein the aliphatic alcohol is employed in proportions of 10 wt % to 5000 wt % based on a mass of the epoxide unit-bearing organosilicon compounds.

8. The process as claimed in claim 2, wherein Z is selected from the formulae

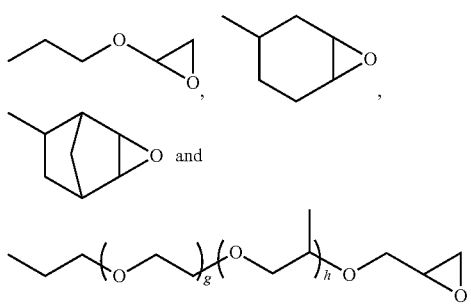

where g+h=1-100.

9. The process as claimed in claim 8, wherein $R^7$ represents hydrogen or a linear, branched or cyclic saturated or unsaturated alkyl group having 1 to 10 carbon atoms or a benzyl or phenyl group.

10. The process as claimed in claim 9, wherein $R^8$ and $R^9$ are each independently selected from the group consisting of $-CH_3$, $-CH(CH_3)_2$, $-CH_2-CH(CH_3)_2$, $-CH(CH_3)-CH_2-CH_3$, $-CH_2-OH$, $-CH_2-CH_2-OH$, $-CHOH-CH_3$, $-CH_2-SH$, $-CH_2-S-S-CH_2-CH(NH_2)COOH$, $-CH_2-CH_2-S-CH_3$, $-CH_2-CH_2-CONH_2$, $-CH_2-CONH_2$, $CH_2-CH_2-COOH$, $CH_2-COOH$, $-CH_2-CH_2-CH_2-NH-CO-NH_2$, $-CH_2$-phenyl, $-CH_2$-(4-hydroxyphenyl), $-CH_2-CH_2-CH_2-CH_2-NH_2$, $-CH_2-CH_2-CH_2-NH_2$, $-CH_2-CH_2-CH_2-NH-C(=NH)-NH_2$, $-CH_2$-(4-imidazolyl) and $-CH_2$-(3-indolyl).

11. The process as claimed in claim 10, wherein $R^1$ and $R^2$ are selected from the group consisting of hydrogen, methyl, ethyl and vinyl.

12. The process as claimed in claim 11, wherein the aliphatic alcohol is employed in proportions of 10 wt % to 5000 wt % based on a mass of the epoxide unit-bearing organosilicon compounds.

* * * * *